AUTOMATIC PRODUCTION APPARATUS AND METHOD
Original Filed April 8, 1965 6 Sheets-Sheet 1
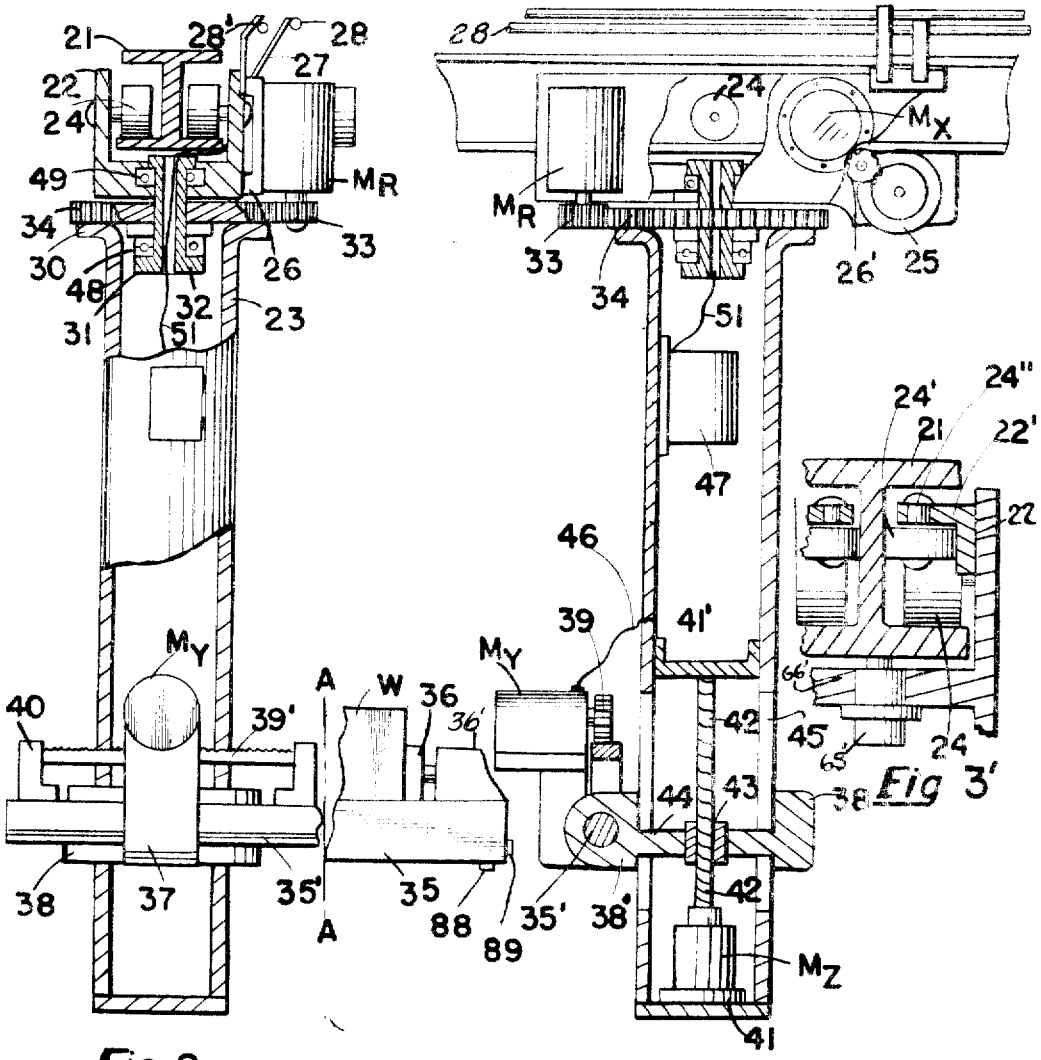
Fig. 2
Fig. 3
Fig 3'
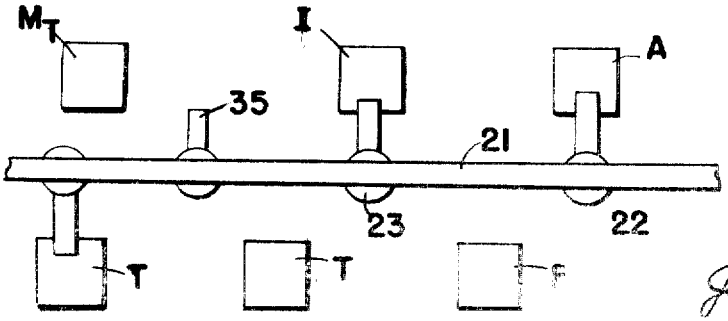
Fig. 1
INVENTOR.
Jerome H. Lemelson INVENTOR.
Jerome H. Lemelson

AUTOMATIC PRODUCTION APPARATUS AND METHOD

Original Filed April 8, 1965 6 Sheets-Sheet 3

INVENTOR.
Jerome H. Lemelson

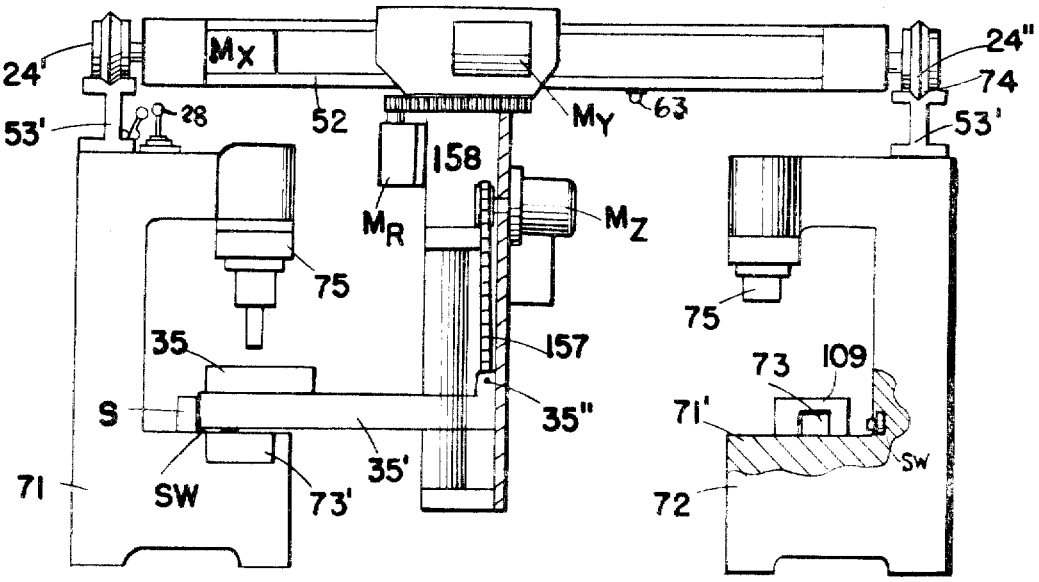
Fig. 9
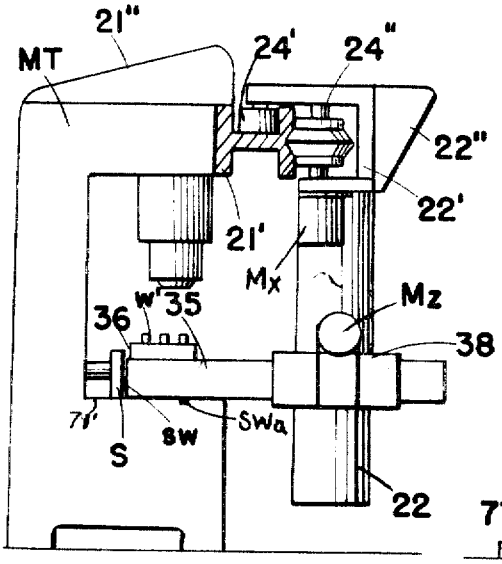
Fig. 10
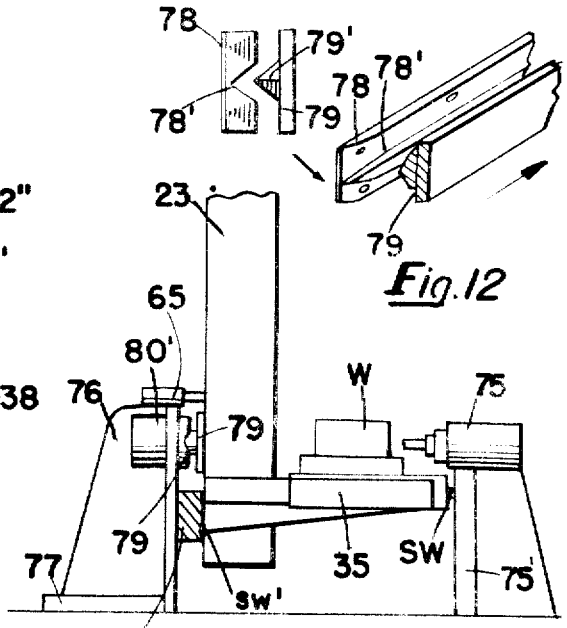
Fig. 12
Fig. 11
INVENTOR.
Jerome H. Lemelson

AUTOMATIC PRODUCTION APPARATUS AND METHOD

Original Filed April 8, 1965 6 Sheets-Sheet 5

INVENTOR
Jerome H. Lemelson

AUTOMATIC PRODUCTION APPARATUS AND METHOD

Original Filed April 8, 1965 6 Sheets-Sheet 6

INVENTOR.
Jerome H. Lemelson

United States Patent Office

Re. 26,770
Reissued Jan. 20, 1970

26,770
AUTOMATIC PRODUCTION APPARATUS AND METHOD

Jerome H. Lemelson, Metuchen, N.J., assignor to The Molins Organisation Limited, London, England, a corporation of Great Britain Original No. 3,313,014, dated Apr. 11, 1967, Ser. No. 465,812, Apr. 8, 1965. Application for reissue Apr. 11, 1968, Ser. No. 724,317
Int. Cl. B23p *23/04*
U.S. Cl. 29—33 28 Claims

Matter enclosed in heavy brackets [ ] appears in the original patent but forms no part of this reissue specification; matter printed in italics indicates the additions made by reissue.

This invention relates to automatic production apparatus and is a continuation-in-part of my copending application Ser. No. 152,702 for Automatic Production Systems, filed on Oct. 17, 1961, which was a division of application Ser. No. 449,874 filed on July 28, 1954, now abandoned.

In the art of fabricating products automatically by use of a plurality of machines operative to perform various operations on said products or components thereof, continuous flight or belt conveyors have been employed for the transfer of articles or assemblies between machines. U.S. Patent 2,139,403 provides a machine transfer apparatus employing different lengths of helical screw drives operative to effect the transfer of work holding fixtures between machine tools. However, such systems are relatively inflexible and are designed to perform a particular machining operation relative to a particular work piece and repeat said operation in the same manner on each work piece fed to the transfer line. If changes are required in the operations to be performed, machine tool set-ups must be changed, a function which heretofore required the expenditure of time and manual labor resulting in substantial machine idleness or down-time.

Production requirements are frequently of such a nature as to require changes in the specification of a product either resulting from variations in the requirements of the user, the use of different forms or models of the same product or engineering revisions. For example, it may be desired to change the location, number or size of holes in a portion of a work piece; vary the degree or type of finish; vary the shape; add or remove components from an assembly; inspect different portions of a work piece or form articles in different manners. Using conventional transfer machinery, such product variation requirements are frequently costly and may require rebuilding the machine line. At the least, they will require that the machine line be idle during the changeover procedure with a resulting interruption in production.

It is, accordingly, a primary object of this invention to provide an automatic production apparatus including a transfer system which is flexible and capable of performing a plurality of different operations on a work piece in a cycle which may be varied without changes in machine set-up.

Another object is to provide an improved automatic production apparatus including a transfer conveyor system and a plurality of production machines disposed adjacent to said transfer conveyor, said conveyor system being operative to transfer different articles to selected of said machines for the performance of different production function thereon whereby a plurality of different articles may be processed without changes in machine set-up.

Another object is to provide an automatic production apparatus including a plurality of production devices and a plurality of carriers for work-in-process which are operative to receive, transfer and preposition work pieces of different shape to selected of said production devices.

Another object is to provide an automatic production apparatus including a work transfer conveying system, a plurality of production devices and machines at which at least certain are variably operative to perform different operations on work-in process, said apparatus including variable programming means operative to vary the operation of said variable devices upon the positioning of work by said conveying apparatus at said devices.

Another object is to provide an automatic production apparatus including a plurality of power operated devices each defining a different work station operative to perform different operations on work-in-precess and a transfer conveying system for said work including a plurality of individual work holding fixtures which are adapted to hold and preposition work of different shape with respect to selected of said power operated devices, said apparatus including control means associated with each work holding fixture operative for the selection of work stations at which to stop and position a fixture and further operative to control the operation of machines at the selected work station.

Another object to provide automatic machinery including improved means for communicating between a work carrier movable between work stations and a fixed command signal generating station or a variably controllable machine operative to cooperate with or perform operations on work held by said carrier.

Another object is to provide an improved automatic production system including a plurality of production machines and a conveying system including a plurality of carriers for transporting work in process to selected of said machines, said system including separate program controllers mounted on each of said carriers and operative to control operation of both the carrier and at least certain of said production machines.

Another object is to provide an automatic production system including a plurality of work stations containing variably operative apparatus, and a plurality of work holding fixtures selectively positionable with respect to each of said stations, each fixture containing program control means for the apparatus at said stations.

Other objects and advantages will be apparent from the following description, the appended claims and the accompanying drawings in which:

FIG. 1 is a plan view of a portion of an automatic production line showing a series of production machines and a plurality of work transfer carriers operative to preposition work in process at selected positions of said machines;

FIGS. 2 and 3 are views of a work transfer carrier applicable to the system of FIG. 1;

FIG. 9 is an end view of a modified form of the carrier illustrated in FIG. 4 shown at a typical work station;

FIG. 10 is an end view of a modified form of mono-rail carrier, support therefor and machinery at a typical work station;

FIG. 11 is a partial end view of a work transfer carrier at a production station showing further means for prepositioning and stabilizing the carrier;

FIG. 12 is an isometric view of a portion of the carrier prepositioning means of FIG. 11;

Figure 4:
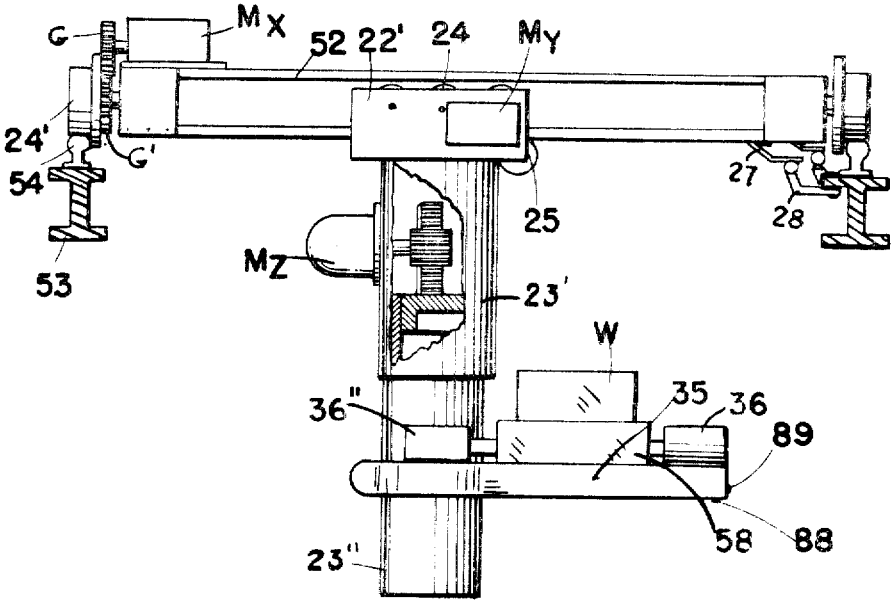
FIG. 4 is an end view of a work transfer carrier with parts broken away for clarity employing a bi-rail conveying system.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which wall within the scope of the invention as claimed.

There is shown in FIG. 1 an automatic conveying system including means for automatically transferring work-in-process relative to a plurality of production and/or storage locations at which are located different machines for performing different operations on work conveyed thereby. A guide means or conveyor 21 is illustrated for conveying or guiding a plurality of fixtures or carriers designated 23, etc. relative to a plurality of work stations T at each of which is located one or more power operated devices or tools designated T, F, I, A which are capable of performing various operations on work prepositioned by or transferred thereto from the carriers 12. For example, T may represent a machine tool for cutting work; F a finishing tool such as a spray-paint applicator, polisher or buffer; I, an inspection tool or station; and A an assembly apparatus or station operative to assemble, weld or otherwise secure components or material to the work held by the carrier. While a preferred form of the conveying system is one in which notation 21 refers to a track such as an overhead monorail guide for a carrier movable thereon under its own power, other forms may include floor mounted tracks or other guide means for powered carriers, or any suitable powered or free conveyor along which the carriers 12 may be driven or caused to travel.

Means are provided in the system illustrated in FIG. 1 for automatically effecting the following functions and operations:

(a) Prepositioning and retaining one or more units of work to be processed or operated-on on a carrier which is shaped or otherwise provided with means permitting it and the work held thereby to be prepositioned relative to any of the machines or equipment which is operative to perform on the work.

(b) Controlling the movement of the carrier to selected work stations and prepositioning it at said selected stations by a variable programming means mounted on the carrier.

(c) In those instances where the selected machine may be varied in its operation to perform different operations on a work-piece, variations in the setting, position, speed or other variable or variables associated with the machine may be preset, varied or controlled to change in accordance with a predetermined program by signals derived from a predetermined controller mounted on the carrier. The control action is accomplished by coupling the output of the carrier controlled with the controls for the selected machine when the carrier is at the work station of the machine preferably by mechanically coupling outputs of the carrier mounted controller with an input to the controls for the machine. In another form, the carrier programmer output is coupled to the input to the machine by means of a light source modulated by the programmer and detection means including a photo-multiplier tube or other electro-optical means coupled to the machine controls.

There is shown in FIGS. 2 and 3 details of one form of conveyor or carrier for a work piece W applicable to the production system illustrated in FIG. 1. The carrier 22 includes an overhead carriage 22' provided with a plurality of wheels 24 rotationally mounted thereon and operative to travel longitudinally along the overhead monorail track 21 for transferring the work from station to station or machine to machine as described. Supported by and depending downwardly from the carriage 22 is an assembly including a vertical column 23 and a fixture movable up and down the column including a platform 35 on which the work retaining means is mounted.

The carrier is power driven along the overhead track 21 by means of a reversible gear motor Mx mounted on the carriage 22 and operative to rotate through gears 26' a wheel 25 which frictionally engages the bottom surface of the track 21 for moving the carrier therealong. Electrical energy for the various motors associated with the carrier is provided by means of a plurality of wires or slide bars 28, 28' which are insulatedly supported off and parallel to the track 21 and which are slidably engaged by brushes 27 mounted on and projecting from carriage 22.

The carrier illustrated in FIGS. 2 and 3 includes means for rotating the article handling components situated beneath the carriage 22. The upper end of column 23 is secured to a large circular gear 34 preferably having as a rotational axis the longitudinal axis of the column. A second reversible gear motor MR is shown secured to the side wall of the carriage 22 and is provided with a small circular gear 33 secured to its output shaft which engages the peripheral teeth of gear 34 for rotating same in either direction depending on the operation of the motor MR. Thus, work held by the fixture retained by column 23 may be rotated through a circular path for prepositioning same relative to a work station or machine.

Column 23 is rotationally supported by overhead carriage 22 by means of a hollow pin 31 having flared ends 32. The pin 31 passes through aligned holes in the bottom wall of the carriage 22 and the large circular gear 34 attached to the flared end 30 of column 23. Ball bearings 38 and 49 are disposed between the flared ends of the pin 31 and the respective surfaces of the carriage wall and the gear plate to facilitate rotation of the assembly. Pin 31 is provided hollow to permit a cable 51 to extend therethrough from wires connected to brushes 27 to provide power and control signals to the various servo motors and devices operative on the assembly including column 23.

Notation 47 refers to a housing for control apparatus such as a computer operative to generate command control signals for controlling the operation of the various servo motors associated with the conveyor and, in certain arrangements as will be hereinafter described, the operation of one or more of the machines or production equipment mounted adjacent the track or guide way 21 on which the carrier travels.

The fixture for supporting the work piece W includes a collar 38 which is slidably movable up and down the column 23 between predetermined limits thereon. Power operation of collar 38 and the work holding assembly secured thereto is effected by means of a reversible gear motor Mz shown mounted within the column 23 and having a long worm gear 42 secured to its output shaft and supported in bearing at its other end by means of a flanged plate 41' secured to the inside surface of the side wall of column 23. A bushing 43 provided with internal helical teeth is movably mounted on the worm 42 and supports collar 38 on column 23. A plurality of vertically extending slotted holes 45 are provided in column 23 through which extend spokes 44 connected to collar 38 and the helical gear collar 43. Thus, as motor Mz rotates, the helical gear formation on shaft 42 is operative to urge collar 43 longitudinally with respect to shaft 42, the direction of which will depend upon the direction of rotation of said shaft.

The platform 35 is shown movably supported with respect to column 38 on a cylindrical rod or beam 35' supported by 38 and extending outward therefrom. The platform 35 may be locked in a predetermined position along the cylindrical beam 35' or may be advanced and retracted thereon with respect to column 23 by means of a reversible gear motor My mounted on an extension 37 of the platform and having a pinion gear 39 connected to its output shaft which engages the teeth of a rack 39' supported off beam 35' along substantially the length thereof by a plurality of brackets 40. Notation 38' refers to the extension of collar 38 which supports beam 35'.

Also shown in FIG. 2 is a clamping servo device 36' mounted on the platform 35 and operative to advance and retract a clamp 36 against a surface of the work W. It is assumed that a stop or second clamp (not shown) is provided on platform 35 to retain the work W in predetermined position with respect to the platform 35 and to cooperate with the clamping device and prevent movement thereof during the clamping action. It is also noted that the notation W may refer to a fixture mounting one or more work pieces to be predeterminately positioned on platform 35 for locating same with respect to the machines or apparatus at the various work stations operative to perform various operations thereon.

Power to operate motor Mz is provided through wires (not shown) extending along the interior of the column 23 and power for operating motor My is provided by a flexible wire 46 passing thereto from the interior of the column as illustrated.

The apparatus illustrated in FIGS. 2 and 3 is subject to variation in its design and degrees of movement of the various components depending on the particular production requirements.

In FIG. 3 is shown a variation in the means for guiding the overhead carriage along the monorail track 21. The carriage 22' is provided with a plurality of wheels 24 operative to engage the upper surface of the lower flange of the I-beam track 21 and vertically positions the column assembly. To provide for lateral stability and prepositioning, a plurality of further wheels 24' are disposed to rotate about vertical axes on both sides of the vertical rib of the I-beam and engage respective opposite faces thereof. The wheels 24' are preferably four or more in number and are each supported by a bracket 22' extending inwardly from the vertical side walls of the carriage 22. Shafts 24'' support each of the wheels and are rotationally supported by brackets 22'. In a preferred form, the wheels 24' may each comprise ball or roller bearings which are operative to engage the opposite surfaces of the vertical rib of I-beam monorail track 21.

Further details of transfer conveyor apparatus of the type illustrated in FIGS. 2 and 3 and applicable to the automatic production system of FIG. 1 are illustrated in FIGS. 4 to 8. In FIG. 4, an overhead bi-rail conveying system is shown and the work carrier includes a bridge assembly including a beam assembly 52 with two pairs of wheels 24' rotationally supported at both ends thereof and adapted for moving the bridge and a carrier suspended therefrom, longitudinally along parallel overhead tracks comprising I-beams 53 and rails 54 disposed on top of each beam. A reversible gear motor Mx having a gear G on its output shaft is coupled thereby to a gear G' on a shaft extending between wheels at opposite ends of the bridge 52 for power driving the assembly along the overhead track arrangement. Movable along the I-beam 52 is a further assembly of the type provided in FIGS. 2 and 3 including a carriage 22' mounting a reversible gear-motor My for driving said carriage along track 52 and an assembly depending downwardly from 22' which is a modified form of the columnar assembly previously described.

In FIG. 4, a first tubular column 23' having an open lower end is fixedly secured to the bottom of carriage 22'. Movable in a telescoping manner within 23' is a second cylindrical column 23'' which supports the work holding platform and servo devices 36 and 35'' operative for positioning and/or clamping the work or its holding fixture in place on the platform. A reversible gear motor Mz mounted on the wall of column 23' is operative to raise and lower column 23'' by means of a rack and pinion or other suitable means: Conducting wires 28 are shown insulatedly supported by one of the parallel tracks and are swept by brushes 27 insulatedly supported on the bridge for conducting power and control signals to the various mentioned servo devices. Notations 88 and 89 refer to limit switches or other sensing means situated at the end of platform 58 and operative to effect prepositioning of same as will be hereinafter described.

Figure 5:
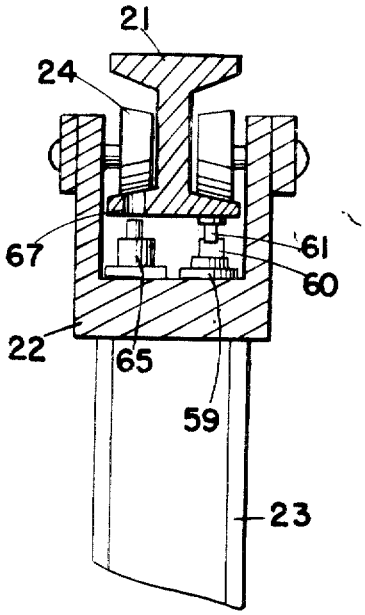
FIG. 5 is an end view of a portion of a mono-rail traveling work transfer carrier showing control and locking means therefor.

In one form of the invention, control of movement of the described overhead traveling carriages for prepositioning the work held thereby with respect to the various production devices of the system is effected by generating feedback pulses with movement of said carriage along its track and utilizing same to uncount one or more predetermining counters or otherwise affect cycle controllers. In FIG. 5 a plurality of limit switches 59 and 65 are shown secured to the top surface of the bottom wall of the carriage 22. The actuator arm 60 of switch 59 is operative to become engaged by pins 61 secured at selected locations along the bottom flange of the I-beam track 21 while the actuator arm of switch 65 rides against the bottom surface of the flange of 21 and activates the switch when it rides in and out of cavities or holes provided in said flange in the path of said actuator arm. Operation of either or both said limit switches may be operative to effect generations of signals for automatic feedback control of the position of the carrier or may be operative to effect stoppage of the motor driving said carrier along track 21 and initiation of a second control action by starting a further motor or motors associated with the described work positioning apparatus.

Figure 6:
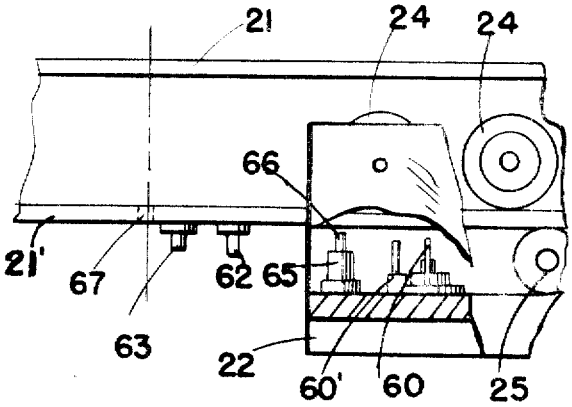
FIG. 6 is a side view with parts broken away for clarity of the apparatus of FIG. 5.

In FIG. 6, two pins 62 and 63 depend from the flange of the overhead I-beam track 21 and cooperate in precisely positioning the carriage 22 at a selected position on said track. A first pin 62 is operative to effect actuation of one of the limit switches mounted on the carriage 22 which activates control means for slowing down the motor driving the carriage in the direction of the limit defining stops while a second pin 63 situated beyond pin 62 is operative to deflect the actuator of a second of said limit switches for precisely stopping carriage 22 after it has been slowed down. More precise positioning control is thus possible as the inertia of the carrier has been substantially reduced due to the reduction in speed prior to stopping. Notation 65 may also refer to a lineal actuator such as a solenoid having a projectable shaft 66 operative to be projected into hole 67 in the I-beam flange upon becoming aligned therewith for precisely aligning carriage 22 and the work positioning apparatus therefore.

Figure 7:
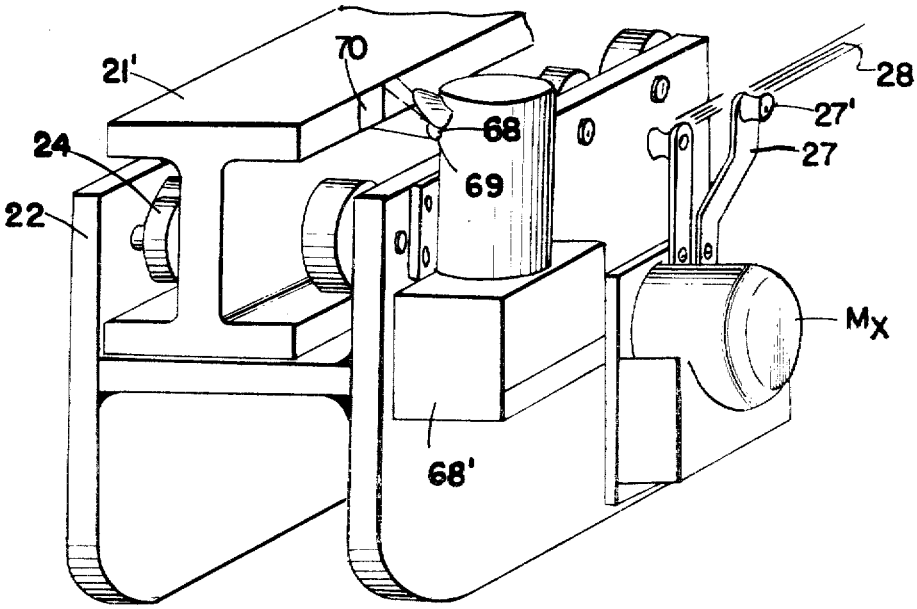
FIG. 7 is an isometric view of a modified form of work transfer carrier showing means for scanning the guide means therefor for prepositioning the carrier.

FIG. 7 illustrates further means for effecting positional control of the carriage along the overhead track 21 and includes a photoelectric relay including a light source 68 adapted to project a beam of light against the edge of the upper flange of the I-beam 21' which light is reflected back to a photoelectric cell 68 situated adjacent the light source when reflective markers or strips 70 situated on said flange edge are intersected by said light. A pulse is thus generated at the output of a photoelectric controller 68' which may be used for stopping a motor or uncounting a predetermining counter for effecting positional control.

FIG. 9 illustrates a modified form of the apparatus shown in FIG. 4 operatively positioning a work holding fixture 35 with respect to a production machine 71.

Figure 8:
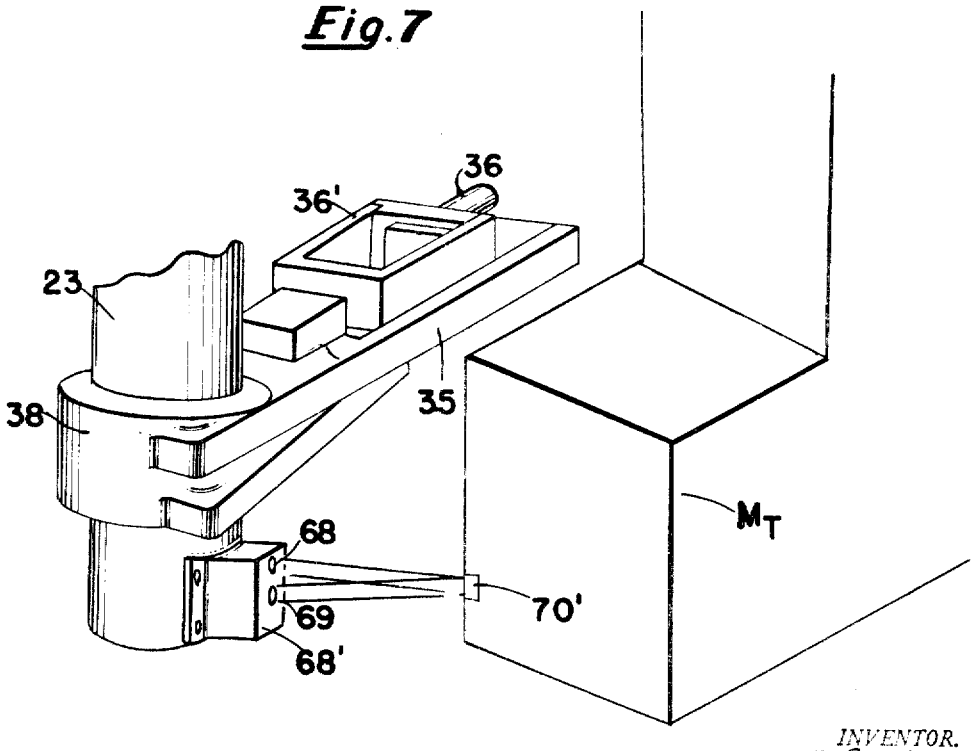
FIG. 8 is an isometric view of a modified form of work transfer carrier showing means for scanning locations sensing means at a work station.

In FIG. 8 is shown an arrangement whereby the sensing device comprises a photoelectric cell 69 and light source 68 mounted adjacent each other in the same housing 68' which is secured to the lowermost portion of the vertical column 23 and is positioned so as to scan reflective markers 70' disposed on adjacent machine tools or devices MT situated along the route of the carrier supporting the work-in-process. Feedback signals are thus generated when the light from the light source 68 is reflected by the reflective markers 70' back to the photoelectric cell 69 which becomes energized thereby and generates an output which is fed to the predetermining counter or positional controller described herein.

The sensing device situated in housing 68' is thus operative to sense the presence of a particular machine or production device in the path of travel of the carrier and to generate a signal for further controlling the carrier and movement of the work held by the fixture 36' supported by the platform 35 extending outward from the column 23.

The signal so generated may be operative to effect change in the direction of movement of the carrier components thereof or, in the simplest form of control, effect braking or stoppage of the various servo motors so as to preposition the work in alignment with the production tool or device adapted to scan or operate thereon. Depending on the nature of the automatic control device or programmed work positioning computer, the exact mode of control initiated or effected when the cell 69 senses light reflected from the marker 70' will be responsive to the signal generated by said sensing means.

Various automatic production setups applicable to the apparatus of the type herein provided are illustrated in FIGS. 9–11. In FIG. 9, a modified form of the apparatus shown in FIG. 4 is illustrated and is operative for positioning a work holding fixture 35 with respect to either or both illustrated production machines 71 and 71'. The machines which may comprise any form of production device include power operative devices 75 and 75' such as motor driven drills, mills, grinders, inspection devices or other forms of tools each of which are shown mounted on a C-frame with the two frames situated laterally aligned with each other and spaced apart a sufficient degree to permit passage therebetween of the work holding carrier. A plurality of such machines are preferably paired in alignment with each other along a production line and define two rows of machines the frames of which are operative to support the overhead tracks or rails 53' along which the wheels 24 and 24' of the bridge crane mounting the work holding carrier travel. In other words, the frames or supports for the production machines themselves are operative to support the work holding carrier during its travel from station to station of the production line.

The carrier of FIG. 9 is shown prepositioning the work holding fixture 35 with respect to machine 71 and is rotatable on the overhead carriage thereof which moves along track 52 so that the work held in fixture 35 is also positionable with respect to the machine tool 71' situated across the aisle from 71. Notation 72 refers to the base or bed of the machine tool which is operative to support the laterally extending arm 35' on which work holding fixture 35 is mounted. When it comes to rest, arm 35' is disposed on the upper surface of the bed 72 so that the major portion of the vertical forces applied to the work by the machine tool is resisted by the bed of the tool rather than arm 35'.

Notation 73 refers to means situtated on the bed 72 of the machine tool for prepositioning and locking arm 35' in place during machining or other operations applied to the work. Thus, if forces are applied to the work are other than vertical, resistance to movement thereof will be effected by the device 73. Device 73 may comprise automatically operative clamps such as solenoid or motor actuated devices which engage arm or platform 35' upon its movement to a predetermined position at the machine tool or production device and are operative to clampingly retain said arm and/or the fixture 35 in a predetermined location with respect to the tool or production device. Notation 73' refers to an electro-magnet situated in the base of the frame for tool 71 which is automatically operated to magnetically attract and retain arm 35' thereagainst during the machining or other production operation on the work.

Other features of FIG. 9 include a stop S operative to preposition the platform with respect to the machine tool frame and a limit switch SW located on the machine tool frame and positioned to become engaged by advancement of the end of the platform 35' thereagainst for initiating operation of the machine tool and/or the means clamping the platform 35' against the upper surface of the machine tool bed 72. In FIG. 9, vertical movement of the platform 35' is effected by means of a sprocket drive means operated by motor Mz which drives a chain or belt 157 connected to the platform 35' to raise and lower same. FIG. 10 illustrates another form of the invention in which the work carrier is modified and is operative to travel along a single track supported by the frames of various production tools defining the production line. The production tool MT is shown having a C-frame supporting an I-beam 21' extending outward from the upper portion of the frame and secured to a plurality of similar frames or tool supports. The overhead carriage 22' for the carrier is modified so as to support a plurality of wheels 24'' which rotate about vertical axes and engage the outer face of a flange of the I-beam track 21'. Further wheels 24' are supported for vertical rotation and engage the undersurface of a flange of track 21' to vertically align column 22. One or more of the wheels 24'' are power operated by a motor Mx secured to the upper portion of column 22. Brackets 21'' and 22'' respectively provide additional support for the track 21' and carriage 22'. The work W' shown in FIG. 10 comprises a plurality of small parts which are prepositioned on the arm 35 by means of a part holding fixture 36 which is so located that the small parts W' are prepositioned at the machine tool when the end of arm 35 engages an adjustable stop S which is prepositioned on the upper surface of the base of the C-frame.

FIG. 11 shows further details of means for prepositioning a carrier with respect to a production station. A V-block 79 is secured to the carrier column 23 or platform 35 and is operative to engage in a V-shaped channel 79' secured to a prepositioning column or mount 76 having a base 77 which is bolted or otherwise secured to the floor of the production area or device. The V-shaped channel in member 79 is so positioned as to precisely locate the platform 35 with respect to a production device 75 shown having a tool aligned with the work W. A sensing device such as a limit switch SW' or other suitable means is located near the lower end of column 23 and is operative to sense the presence of a prepositioning block 80 which serves as a bucking means for supporting column 23 during machining operations on the work held by platform 35.

FIG. 12 shows further details of the V-block 79 and V-way 78 described. The V-block has a wedge shaped protrusion 79' which is operative to engage in the V-channel 78' in 78 which is shaped so that 79 may slide therein from either end of the V-way 78. In other words, the ends of the V-way 78 are tapered to receive the wedge 79' as illustrated. In FIG. 11, an electro-magnet 80' or other suitable clamping device as described may be mounted on column 76 and is operative to engage and retain V-block 79 within V-channel 79' upon alignment of the two. The device 80' may also be mounted on the column 23 of the work carrier and is controlled to either operate automatically by means sensing the presence of the carrier or a signal from the computer 47.

Figure 13:
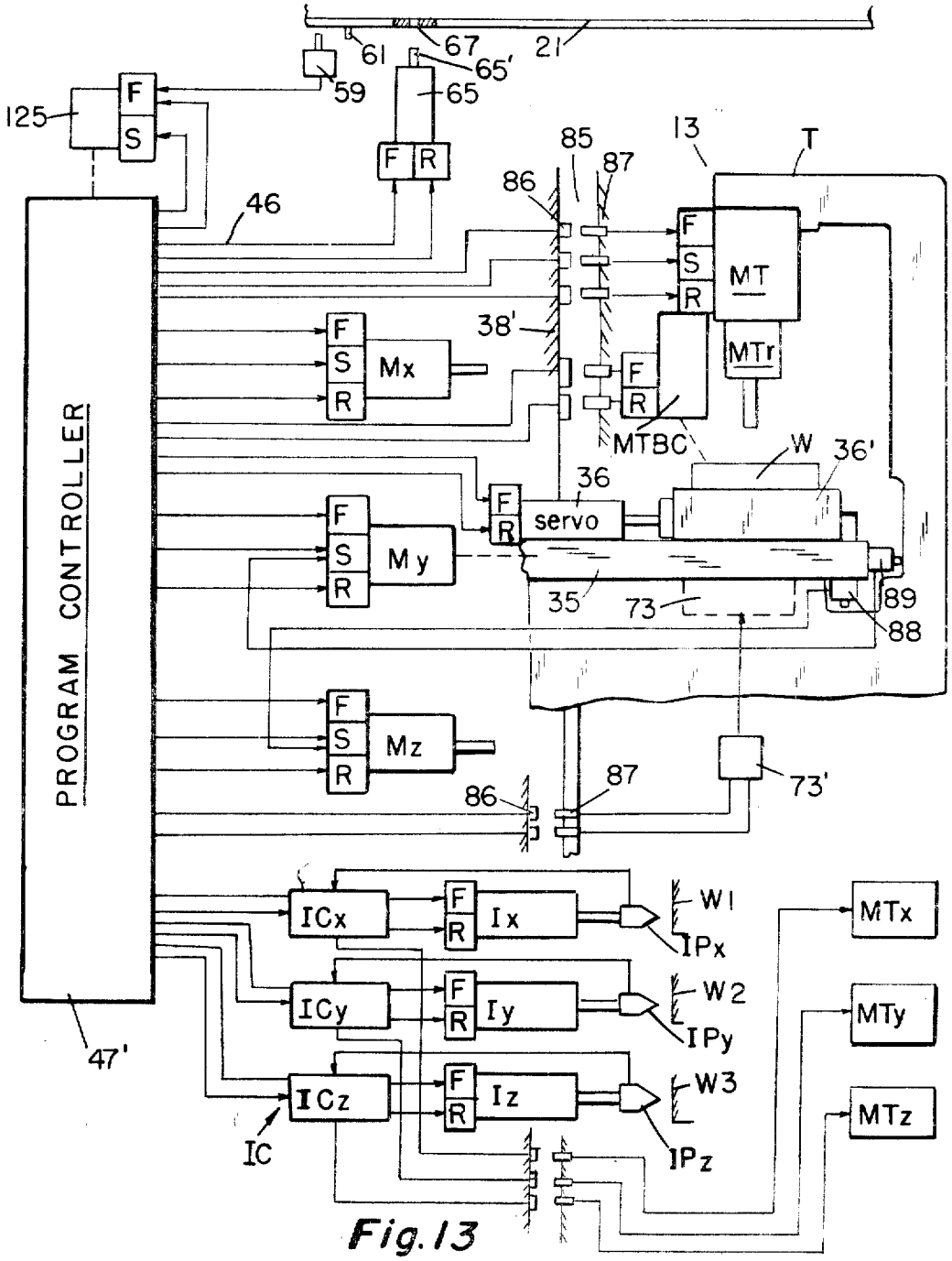
FIG. 13 is a schematic diagram of an automatic control system applicable to the automatic production apparatus of this invention.

FIG. 13 shows one form of automatic control system applicable to the apparatus herein described. The system illustrated utilizes a cycle controller 47' such as a tape or card reader, or multi-circuit timer driven by a constant speed motor 125 and having a plurality of output circuits 46 each of which may become energized during a predetermined time or plurality of times in a production cycle to activate motor controls and the like to effect prepositioning of the carrier and work held thereby with respect to one or more production machines and, in certain instances, control the apparatus at selected work stations in a manner to effect predetermined operations on said work.

In describing a typical cycle of operation of the apparatus by the means illustrated in FIG. 13, it is assumed that the described overhead track traveling carrier is approaching a work station containing a machine or device adapted to perform operations on work W carried thereby. The limit switch 59 mounted on the overhead carriage is activated by marker device or pin 61 supported by the overhead track and a first control signal is generated thereby which is transmitted to the start control F of motor 125 operating sequential controller 47'. A plurality of outputs of multi-circuit timer or card reader 47' thereafter become energized in sequence to effect the various described operations which include prepositioning of the work relative to the production device or tool at the particular station and, in certain instances, operation of the device T in a predetermined manner to perform predetermined operations on the work. A first pulse from 47' may be transmitted to the stop control S of motor Mx and another pulse to the activating control F of a clamping device such as a solenoid 65 operative to engage the overhead track 21 and lock the carriage in position thereon by projecting its actuator shaft 65' against the flange of track 21 to clampingly engage same and/or be forced into an alignment hole 67 therein as described to predeterminedly position and prevent movement thereof during operation of the work if such a function is necessary. A third output of the sequential controller 47' may next be operative to energize the forward control F of motor or servo My which is operative to move the platform 35 in a direction towards the production device or machine MT which movement continues until limit switch 89 mounted at the end of platform 35 engages a stop or surface of the base of the machine tool MT. Actuation of switch 89 is operative to generate a pulse for energizing the stop control S of motor My to arrest forward movement of the platform 35 with the work prepositioned at the machine tool MT and further prepositioning of 35 may be effected by energizing another output of the controller 47' connected to the drive control F of motor Mz which lowers or raises platform 35 until limit switch 88 engages a stop or surface of the machine tool bed. Activation of switch 88 is operative to generate a pulse which is transmitted to the stop control S of motor Mz further prepositioning the platform with respect to the tool.

At this point, the tape or card reader 47' may be operative to generate control signals for activating the controls of the work clamping servo 36 if it is desirable to remove the work W and/or its holding fixture 36' from platform 35 at the machine device MT for further prepositioning the work thereat but such operation may be selective for certain machines and will depend on whether or not the control circuits extending from 47' to the controls of the work clamping servo 36 are actually activated.

Also illustrated in FIG. 13 is a device 73 operative to retain, by clamping engagement, magnetic attraction or suction means, the platform 35 of the work handling conveyor against the bed of the machine tool so as to further assure that the work held thereby will not shift or move during operations thereon in an undesired manner. The device 73 is operated by a control or servo 73' such as a motor, fluid ram or the like which is controlled by signals generated on control inputs thereto which extend as outputs of the card or tape reading device 47'.

Also illustrated in FIG. 13 are means for coupling respective control outputs of the cycle controller 47' with inputs leading to the production device or machine tool MT for controlling same in a predetermined manner to perform predetermined operations on a particular workpiece W carried to the work station by the described conveyor. As hereinbefore described, means are provided for coupling outputs of the automatic controller or computer mounted in the housing 47 supported by the work transfer conveyor or work holding fixture. Such coupling means 85 include a plurality of coupling devices 86 such as receptacles or plugs mounted on the platform 35 or an extension thereof and terminating respective output circuits of the multi-circuit program controller 47'. The terminals 86 are operative to electrically couple with respective terminals 87 supported on a common base which preferably is secured to the machine tool or platform therefor in a position to be aligned with the platform 35 of the work conveyor when the latter is advanced thereagainst as described by the operation of one or more of the motors My and Mz. The outputs of coupling devices 87 extend to respective forward, reverse and stop controls F, S and R of the production device or machine tool MT so as to predeterminedly effect control of operation thereof by signals generated by the program controller 47' mounted on the work conveyor.

Upon terminating the particular operational cycle associated with the production device at which the work W is prepositioned, a signal is generated on an output of controller 47' which is operative to energize the stop control S of motor 125 after signals have been generated to energize control for reversing on deactivating the various described clamping, positioning and production machine servos. The termination of the particular cycle is preceded by activating the reverse controls for either or both servo My and Mz and the forward drive control F of motor Mx so as to cause movement of the work conveyor along the overhead track 21 to the next production tool or station. Thereafter, upon activation of the switch or sensing device 59, the controller 47' is operative to effect either a new cycle of control operations to preposition the work holding fixture and/or operate the next production device or tool along the production line or to effect bypassing said next production device by merely maintaining the forward drive control F of motor Mx energized without activating any of the other described controls for the various servos provided in FIG. 13.

Also illustrated in FIG. 13 are inspection means in the form of a plurality of transducers or probes designated Ix, Iy, Iz and C which are operative to sense different surfaces of the work piece or work holding fixture to effect inspection thereof after the operation performed by the particular production device or machine tool. Each of the sensing devices or probes is provided with a respective probe head designated by notations Ipx, Ipy, Ipz, etc. which is movable towards a particular work surface by controlling the operation of a servo motor associated with the probe and operative to advance and retract same. Each of the servo motors is controlled by a computing device such as a predetermined counter, such devices being denoted ICx, ICy and ICz in FIG. 13. Such computing devices or predetermining counters are preset or otherwise controlled by signals generated by the program controller 47' mounted on the work carrier and transmitted thereto at a predetermined interval or intervals during the contolled cycle of operations through the coupling means 85 established when the work holding platform or fixture is positioned as described at the work station.

Movement of the probe heads Ipx, Ipy and Ipz is operative to generate feedback signals which are passed to the respective positional control computers IC and which, in turn, may be operative to control operation of respective motors operating and positioning the machine tool or tools at the work station and denoted MTx, MTy and MTz in FIG. 13. Such motors may be operative, for example, to drive and preposition the machine tool or its mount in a plurality of different directions to perform different operations on the work. The notation MTr refers to a motor operative to rotate or otherwise operate the machine tool at the work station which tool is also moved in a predetermined path by predetermined operation of the tool positioning motors MTx, MTy and MTz. Said motors as well as a tool mounted work moving or clamping servo MTBC are operative in response to respective signals generated by the command control programmer 47' mounted on the carrier or work holding fixture and transmitted to their controls through the coupling means 85 so that the cycle of operation of the tool may be primarily a function of the program recorded in the controller 47' which may be varied merely by varying the characteristics of said recordings so that different operations may be performed by the same tool or production device on different types of work.

The servo positional probes IPx, IPy and IPz thus may be used to locate various surfaces of the work by contact therewith or otherwise sensing said surfaces and provide feedback signals which are used to predeterminedly control tool movement and operation during the initial operations on the work and/or continuously during the operation of the tool. The tool motors MTx, MTy and MTz may be operative to drive or control the position of the tool with respect to the work and/or move the work W with respect to the tool T if released from work holder 36' by the unclamping operation of servo 36. Control of said motors may be effected by pulsing stop, start and reverse controls F, S and R thereof with said pulses generated by predetermining counters in control devices ICx, ICy and ICz which counters are preset by pulse trains transmitted to each from program controller 47', or by other signal means generated by device 47'.

In FIG. 13 the work station illustrated is broadly defined as having any type of production machine T such as a machine tool employing one or a plurality of motors to preposition, move and operate one or more tools or the like associated therewith. Accordingly notation MT is the broad term presented to represent one or a plurality of servo motors or the like operative to position and power the tool or tools at the work station for controlled operations on work prepositioned by the carrier for the work. Therefore the three circuits illustrated as extending from respective outputs of the program controller and coupled to the controls of the production machine MT may actually comprise circuits which are greater in number than those illustrated for controlling various other servo devices (not shown) but associated with the production machine T which may comprise a plurality of motors, solenoids, and other electrically operated or controlled production and work securing or prepositioning means. In other words, one or more tools may be positionable by a plurality of servo driven or servo controlled means which are in turn controlled by the signals derived from the program controller 47' as generated in reading a card, tape, disc or recording drum or by other means therein operative to generate command control signals of predetermined characteristics at predetermined times in a control cycle.

It is assumed in FIG. 13 that the correct electrical power supplies are provided on the correct sides of all switches, servo controls and the like to assure proper functioning of the described apparatus.

Figure 14:
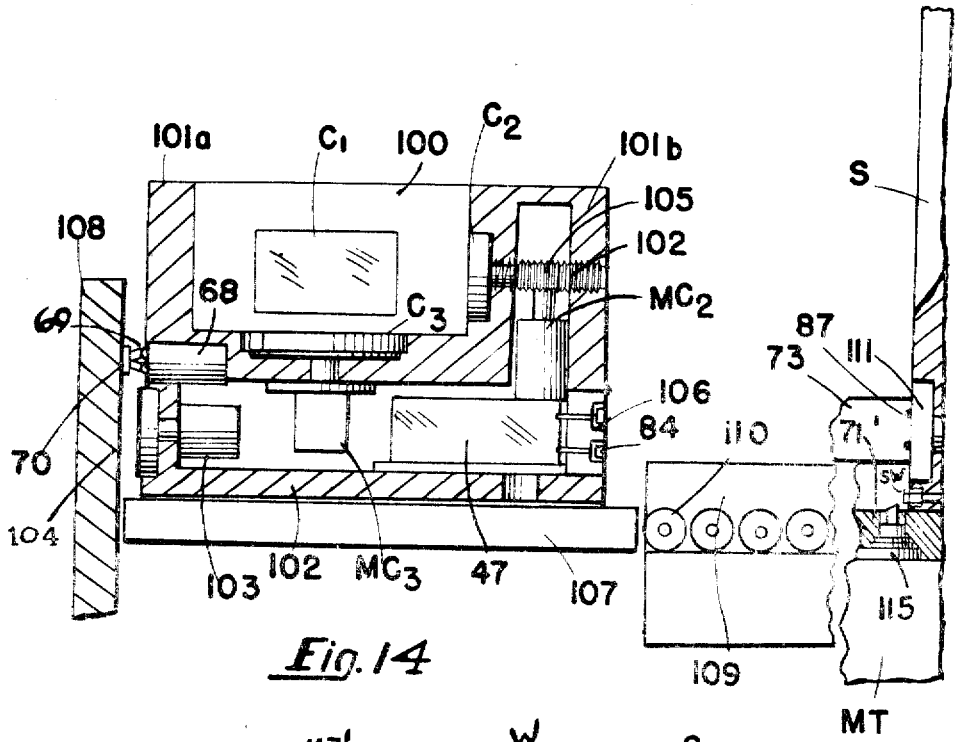
FIG. 14 is an end view of a modified form of work transfer carrier and conveying apparatus therefor in the realm of this invention.
Figure 15:
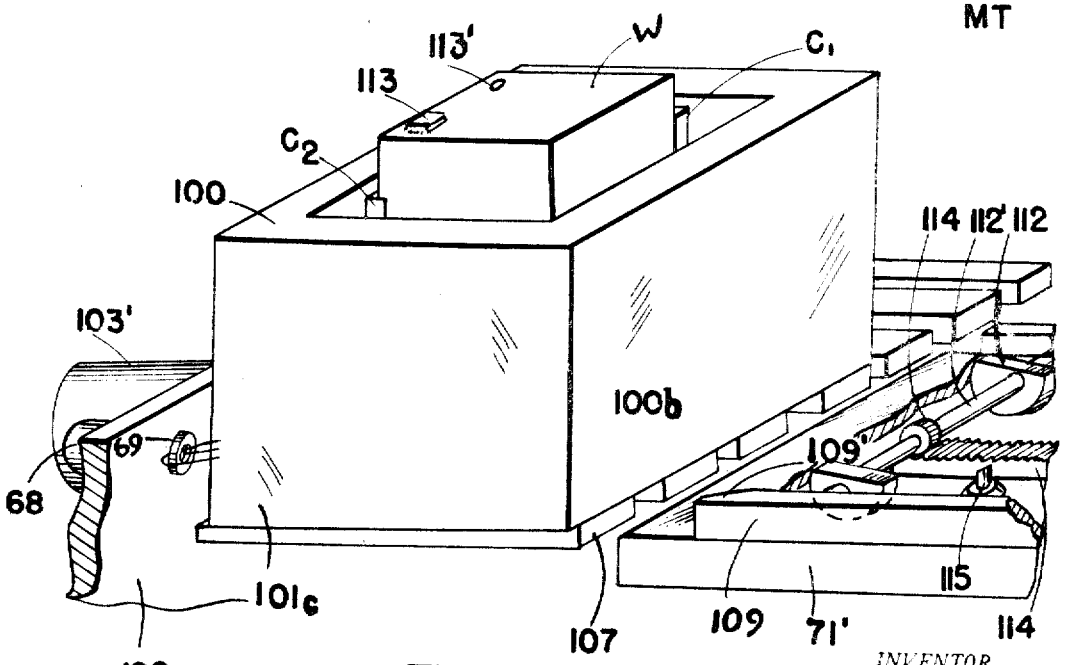
FIG. 15 is an isometric view of a modified form of the carrier of FIG. 14.

FIGS. 14 and 15 illustrate details of conveying apparatus for work-in-process including a work holding carrier 100 operative to travel along a flight conveyor 107 or the like past a plurality of production machine tools for performing various operations on work held thereby. Means are provided for transferring the work holding fixture 100 to selected of a plurality of machine tools disposed adjacent the conveyor 107. The production station or machine tool of FIG. 14 is referred to by the notation MT and is shown having a roller conveyor 109 extending thereto as a branch disposed lateral to the main transfer conveyor 107. The plurality of rollers 110 of the branch conveyor 109 may be gravity of power operated to receive and transfer the work carrier 100 to the machine tool or production device MT, preferably in response to signals generated by a program controller, as described, which is mounted in a housing 47 supported in the base of the carrier 100.

Features of the work carrier 100 illustrated in FIGS. 14 and 15 include rigid side walls 101a and 101b, end walls 101c and 101d and a bottom wall 102. A partition divides the carrier into two volumes or sections, one for securing one or more articles of work to be held by the carrier and the other for retaining one or more work clamping devices, computing, detecting and coupling devices. Notations C1, C2 and C3 refer to respective clamps which are movable from the walls of the upper portion of the carrier against respective surfaces of the work to clampingly engage and hold same. Each of said clamps is projectable and retractable by respective servo devices such as push-pull solenoids or reversible motors two of which MC2 and MC3 are shown operatively coupled to the clamps C2 and C3 for projecting same against the side and bottom surfaces of the work in cooperation with clamp C1 to preposition and retain the work in the upper chamber portion of the carrier 100.

A housing 68 mounting a photoelectric cell and light source is shown in FIG. 14 supported by the side wall 101a of the carrier and is operative to scan reflective markers 70 disposed along the side wall 108 of the conveyor for identifying different work stations in the system. Signals generated by the photoelectric relay in housing 68 each time the photocell thereof detects a marker 70 are transmitted to a control or computing device located within the housing 47 for effecting the transfer of the carrier 100 to selected machine tools. In FIG. 14 each carrier is provided with its own power supply or battery mounted in housing 47 and is deflected by a lineal actuator 103 such as a solenoid mounted on side wall 101a and operative to project a ram shaft thereof against the surface of the side wall 108 of the conveyor under the control of the computing device situated within housing 47 in response to signals generated by the scanning device 68 in the manner hereinabove described for controlling the servo devices of the overhead track travelling carrier.

In FIG. 15 the carrier 100 is transferred from the main conveyor 107 to the branch conveyor 109 by a lineal actuator 103' such as a pneumatic or hydraulically operated ram which operates in response to a signal generated by photoelectric scanning means 68 scanning reflective markers or the like located on the outside of side wall 101a of carrier 100. In other words, in FIG. 15 the carrier 100 is transferred by the application of scanning means located at the side of the main conveyor 107 detecting selectively positioned markers or codes on the carrier. If features of FIG. 14 are combined with those of FIG. 15, transfer of the carrier may be effected by a combination of deflection actions affected by transfer devices 103' located at the side of the conveyor 107 and the transfer device 103 located within the carrier 100.

Further features of the apparatus illustrated in FIG. 14 which may also be applied to the apparatus of FIG. 15 include pluggable electric coupling connectors 84 located on the side wall 101b which are operative to engage and be electrically coupled to respective connectors 87 situated at the machine tool to which the carrier is transferred when said carrier has been moved along conveyor 109 to a particular location or stop position thereat so that signals generated by the program control means located within 47 on the carrier 100 may be transmitted to electrical control apparatus located at the production machine tool MT for controlling same to operate on the work in a predetermined manner as defined by the program control device or devices mounted within housing 47. The machine tool MT is provided with a work prepositioning platform or fixture 71' and a plurality of clamps, one of which 73 is illustrated for clampingly engaging the carrier 100 so as to preposition same with respect to the tool. A limit switch 115 is mounted within the base of the tool receiving platform 71' and has an actuator arm operative to be compressed upon movement of the base of carrier 100 thereagainst. Activation of switch 115 is operative to cause one or more of the servo driven clamps to engage, move and preposition the carrier 100 with respect to the machine tool and may also be operative to initiate operation of the machine tool on the work held by the carrier 100.

In FIG. 15 a clamping arrangement is illustrated which includes a shaft 112' driven by a motor operated rack 114 engaging a pinion 114' secured to shaft 112' in response to activation of a limit switch 115 by the movement of the carrier 100 thereagainst whereafter, a plurality of cam shaped clamps 112 mounted on the ends of shaft 112' engage the outside wall 101a of 100 and force said fixture into position against a stop such as wall S situated at the machine tool for prepositioning the carrier thereat.

It is noted that the control system provided in FIG. 13 may also be applied to systems employing conveyor traveling fixtures of the type illustrated in FIGS. 14 and 15, it being merely necessary to omit servos Mx, My and Mz from the control diagram, FIG. 13.

I claim:

1. An automatic production system comprising:

(a) a plurality of machine tools defining respective work stations of a production line for performing different operations on work-in-process, (b) servo means for each of said tools operable to power said tools in performing various operations on work-in-process, (c) control means for each of said servo means for controlling the operation of said tools, (d) an automatic conveying system including a plurality of carriers for individual work pieces and guide means for guiding said carriers past said work stations, means for predeterminately positioning work on each of said carriers, (e) power means for moving said carriers along said guide means, (f) control means for said carrier power means, (g) said control means being operative for controlling transfer of individual carriers to selected tools, (h) power driven securing means at each work station operative for retaining carriers in predetermined alignment with each tool, (i) means for sensing the presence of a carrier at a work station, (j) said sensing means being operatively coupled to said control means and said carrier securing means for operating same to effect prepositioning and retention of a carrier at a work station, and (k) a variable program control device having a record member containing a plurality of first recordings operative for stopping and positioning a carrier at selected work stations and second recordings operative to control the operation of selected machines in said system for performing predetermined operations on work held by said carriers, (l) means for reading said recordings, and (m) control means for said reading means operative in response to the activation of said sensing means for operating said reading means upon arrival of a carrier at each work station.

2. Automatic production apparatus comprising:

(a) a plurality of separately operative machine tools arranged to define a production line, (b) conveying means for transferring work units to said tools, (c) means for prepositioning work units carried by said conveying means with respect to selected of said tools, (d) means for both selecting the tools for performing on a work unit carried by said conveying means and controlling the operation of at least certain of said selected tools comprising a multi-circuit program controller having a variable program control means operative for generating a plurality of control signals in predetermined sequence on the plural outputs of said controller, (e) means located at said machine tools for identifying each tool, and (f) scanning means operative to scan said identifying means and activate said program controller when work arrives at respective machine tools along said line so as to effect predetermined operations on said work units.

3. Apparatus in accordance with claim 2, a plurality of said machines having variable elements for operating on work-in-process, power means operative to change said variable elements, control means for said variable element power means, said program control device being operatively coupleable to said latter control means to vary same for different units of work whereby different operations may be performed on different work pieces conveyed to said machines.

4. Apparatus in accordance with claim 2, said multi-circuit program controller having a recording member with recordings reproducible to generate variable control signals to effect variable control of at least one of said machine tools, reading means for said recording member, and means for coupling the output of said program controller on which said variable control signals are generated to a selected machine tool to control same upon arrival of a work unit thereat to predeterminately perform on said work.

5. Apparatus in accordance with claim 2 including a carrier for each work unit, retaining means at said machine tools for prepositioning and retaining said carriers and the work units held thereby, means for sensing the presence of a carrier at each tool and means operative in response to the activation of said sensing means for operating said multi-circuit program controller to read recordings and generate signals for controlling the machine tool.

6. An automatic production system comprising in combination, a plurality of machine tools for performing different operations on work-in-process, a conveying system interconnecting said tools including an overhead trackway extending between tools, individual work carriers moveable along said trackway, respective first servo means for driving said carriers between machine tools, first control means for controlling the operation and stopping of said first servo means for positioning a carrier at predetermined machine tools, means on said trackway for identifying the positions of said machine tools, a scanning means mounted on said carriers for scanning said identifying means, said scanning means generating feedback signals for transmission to said control means each time said scanning means scans an identifying means, second control means operative upon prepositioning a carrier at a work station for controlling the operation of the tool at said station, third control means operative upon completion of said tool operation for activating said servo means to cause said carrier to convey the work held thereby along said overhead trackway to a selected machine tool situated further along said trackway.

7. An automatic production apparatus comprising:

(a) means for holding and prepositioning work, (b) machine means for performing various operations on work retained by said holding means, (c) means for conveying said holding means with respect to said machine means, (d) a multi-circuit program controller including means for generating a sequence of control signals, (e) means for moving said holding means and selectively positioning same in operative relationship with said machine means for operatively positioning the work held thereby with respect to said machine means, (f) means for coupling said program controller with said machine means upon operatively positioning said holding means with said machine means and causing said program controller to generate control signals, (g) means for using said signals to control said machine means to execute predetermined operations on work retained by said holding means, and (h) means operative in response to the operation of said program controller for uncoupling said holding means and said machine means and causing said holding means to be moved by said conveying means away from said machine means.

8. Apparatus in accordance with claim 7, said coupling means comprising radiation generating means mounted on said first means, and means including said control signal generating means for modulating said radiation generating means upon establishing coupling between said machine means and said work holding means, and receiving means mounted on said machine means including means detecting the modulated signal and means using said modulated signals to variably control said machine means.

9. Apparatus in accordance with claim 7, including electrically operated controls for said machine means, said coupling means comprising a plurality of electrical contactors movable together and including first contact means mounted on said work holding means and second contact means mounted on said second means located to be engaged with said first contact means when said first means is predeterminately positioned with respect to said machine means for establishing a connection between said controls of said machine means and said program control means.

10. Automatic apparatus comprising:

(a) a plurality of production tools defining different work stations for operating on work-in-process, (b) a guideway extending adjacent said work stations and defining therewith a production line, (c) a self-propelled carrier movable along said guideway, and means for holding work-in-process retained by said carrier, (d) power operated means for moving said work-in-process relative said carrier, controls for varying said power operated means, (e) variable program control means mounted on said carrier including a predetermining controller for controlling said power operated means, (f) means for identifying said work stations, (g) scanning means operative to scan said identifying means and generate feedback signals to said predetermining controller, (h) said predetermining controller being operative to stop said carrier at selected work stations, and (i) means operative upon arrival of said carrier at a selected work station for activiting said program control means to further control said power operated means in a manner to preposition the work retained by said carrier relative to the machine at said selected work station.

11. Apparatus in accordance with claim 10 including servo operated means at a work station for performing variable operations on work conveyed thereto by said carrier, controls for said servo operated means, first coupling means disposed on said carrier and connected to the output of said variable program control means, second coupling means at said work station connected to said servo operated means, means for automatically connecting said first and second coupling means together upon arrival of a carrier at said work station and means for activating said program control means after connecting said coupling means to predeterminately control said work station servo operated means for performing a selected operation relative to the work held by said carrier.

12. An automatic production system comprising:

(a) a plurality of machines defining respective stations of a production line for performing different operations on work-in-process, (b) servo means for each of said machines operative to power said tools in performing various operations on work-in-process, (c) control means for each of said servo means for controlling the operation thereof, (d) an automatic conveying system including a plurality of carriers for work pieces and guide means for guiding said carriers past said work stations, (e) power means for moving said carriers along said guide means, (f) control means for said carrier power means, (g) said control means being operative for controlling transfer of individual carriers to selected tools, (h) power driven securing means at each work station operative for retaining carriers in predetermined alignment with each machine, (i) relay sensing means for sensing the presence of a carrier at a work station, (j) said sensing means being operatively coupled to said control means for said carrier power means and said securing means for operating same to effect the prepositioning and retention of a carrier at a work station, (k) and a variable program control device associated with each carrier and operative in response to signals received from said sensing means to control the carrier power means to stop the carrier at selected work stations and to control the machines at said selected stations to predeterminately operate on work transferred thereto by said carrier.

13. Automatic production apparatus for operating on workpieces comprising a movable support means for work, guide means for said support means, a work station including a powered device operative to perform an operation on work positioned by said movable support means, means for moving and prepositioning said support means with respect to said powered device, locking means operative to secure said work support means at said work station, power means for said locking means, program control means operative for controlling said powered device and said power means for said locking means to lock said support means in position during the operation of said powered device, said program control means being also operative to control said power means for said locking means to release said locking means after said powered device has completed an operation on said work held by said support means for unlocking said support means and means operative upon release of said locking means for moving said support means to convey said work away from said work station.

14. Automatic production apparatus for operating on workpieces comprising in combination with a movable carrier for retaining and prepositioning work in process, means for prepositioning a workpiece on said carrier, guide means for said carrier, a work station including a production tool operative to predeterminedly operate on work positioned by said carrier, means for moving and prepositioning said carrier with respect to said production tool, securing means mounted on said work carrier and operative to secure said carrier at said work station, power means for said securing means, switching means operative upon prepositioning said carrier at said work station for controlling said power means for said securing means to hold and preposition said carrier during the operation of said powered device, means synchronized to the operation of said powered device for releasing said securing means after said powered device has completed an operation on said work held by said carrier for unlocking said carrier and means operative upon release of said securing means for moving said carrier and said work away from said work station.

15. In an automatic production system, a plurality of power operated machines defining a plurality of work stations at least certain of said machines being operative for performing various operations on work-in-process, a plurality of work carrier means movable past said work stations and operative for moving work to selected stations, power means for moving said carrier means, control means for activating said power means to move said carrier means to said selected stations, said control means including a control element mounted to move with the movement of said carrier means, means associated with said station for actuating said control element as said carrier means moves opposite said selected stations, said control element being operative when so activated for deactivating said power means to stop said carrier at said selected stations.

16. In an automatic production apparatus, a plurality of carriers for holding work-in-process, a plurality of power operated devices for performing variable operations on said work, means for moving said carriers and prepositioning work held thereby with respect to selected of said power operated devices, control means for said power operated devices including means for varying the operation of said devices, programming means including changeable record means mounted on each carrier, reading means for said record means operative when activated by said record means to generate a sequence of control signals, means for transmitting signals from said reading means to a selected control means when a carrier is prepositioned with respect to a selected power operated device controlled by said control means, and means operative upon prepositioning a carrier with a selected power operated device for causing said reading means to read the record means on the carrier.

17. An automatic production apparatus comprising:

a machine tool;

a carrier for holding work-in-process; alignment means associated with said carrier for aligning said carrier with respect to said tool;

a first track for supporting and guiding said carrier in movement past said tool;

said machine tool operative to perform operations on work held by said carrier; a second track opposite said tool and having way means aligned to receive said carrier alignment means;

power means for moving said carrier past said machine tool;

said carried alignment means operative to engage said second track upon movement of said carrier opposite said tool to predeterminedly position said carrier and the work held thereby with respect to said tool whereby precise operations may be performed on said work by said tool.

18. An automatic production apparatus comprising:

(a) a conveying system for work-in-process including a trackway and a plurality of self-propelled carriers operative to travel said trackway, (b) a plurality of work stations, (c) first servo means mounted on each carrier for driving same along said trackway, (d) means supported by each carrier for receiving and holding work, (e) variable means at each work station for performing operations with respect to said work, and (f) a multi-circuit programmable controller supported by each carrier and operative for controlling said first servo means to position the carrier at selected work stations, (g) said multi-circuit program controller being also operative for predeterminately controlling the means at each work station for variably performing operations with respect to the work upon alignment of a carrier at a selected work station.

19. Automatic production apparatus comprising:

(a) conveying means for work-in-process, (b) a machine for performing operations with respect to work fed thereto by said conveying means, (c) means at said machine for predeterminately locating and securing work after it is fed to said machine by said conveying means, (d) first power means for moving said conveying means, (e) second power means for operating said work securing means, (f) third power means for operating said machine to perform on said work, and (g) pre-programmed control means for selective actuating said first, said second and said third power means such that work is conveyed to said machine and said machine is predeterminately operated to perform on said work.

20. Automatic production apparatus in accordance with claim 19, said pre-programmed control means being also operative to control said second power means after the termination of operation by said machine on said work to cause said securing means to release work held at said machine and to operate said first power means thereafter to remove work from said machine.

21. Automatic production apparatus in accordance with claim 19 including pallet means for holding and predeterminately locating work, said conveying means including means for moving and guiding said pallet means into operative relationship with said machine, and means for predeterminately locating said pallet means at said machine to pre-position work held thereby with respect to said machine, said securing means at said machine being operative to hold said pallet means for retaining and locating said work at said machine.

*22. A production system comprising a plurality of data-controlled machining units operative to perform different operations on work-in-process and each having means to locate and secure a workpiece holder, conveyor means to convey workpiece holders to and from the machining units, said conveyor means being operable to convey workpiece holders along a path from which there is access to any of the machining units and operable to convey selected workpiece holders independently of other workpiece holders, and control devices operative to control the movement of workpiece holders in the system by said conveyor means so that a workpiece on a holder is fed only to those selected machining units required to perform machining operations on that workpiece and to bypass nonselected units.*

*23. A production system comprising a plurality of data-controlled machining units operative to perform different operations on work-in-process, a workpiece carrier, guide means defining a path for said carrier from which there is access to any of the machining units, reversible drive means to move said carrier in either direction along said path, sensing means effective to sense when the workpiece carrier is at a selected machining unit to which a particular workpiece carried thereby is to be fed, means to feed said workpiece to said selected machining unit, and control means for said drive means operable in conjunction with said sensing means to control movement and positioning of said carrier along said path, whereby the carrier is caused automatically to transport a workpiece to any selected one of the machining units.*

*24. A production system comprising a plurality of data-controlled machining units operative to perform different operations on work-in-process, conveyor means operative to convey workpiece holders along a path through a plurality of access positions from each of which there is access to a different one of the machining units, identifying means to distinguish the machining units, sensing means to read said identifying means when a holder is at an*

*access position, and control means operable in conjunction with said sensing means to control movement of the holder so that a holder destined for the particular machining unit to which there is access from that position is fed toward the machining unit, and a holder not so destined continues along said path by-passing that machining unit.*

*25. A production system for machining workpieces to produce a variety of components comprising a plurality of data-controlled machining units to perform different operations on work-in-process and each having means to locate and secure a common form of workpiece holder carrying differing workpieces, a plurality of workpiece holders of said common form, conveyor means to convey said workpiece holders to and from the machining units, said conveyor means being operable to convey said workpiece holders along a path from which there is access to any of said machining units, and control devices operable to control the movement of said workpiece holders in the system by said conveyor means so that a workpiece holder carrying a particular workpiece is fed only to a predetermined selection of said machining units, said selection being those units required to perform machining operations on that workpiece, so that holders carrying different workpieces can be fed to different predetermined selections of machining units, the selection being dependent in each case on the particular workpiece carried on the holder, said machining units being capable of simultaneous operation on different workpieces.*

*26. A production system for machining workpieces to produce a variety of components, comprising a plurality of data-controlled machining units each having means to locate and secure a common form of workpiece holder carrying differing workpieces, and each capable of performing machining operations according to a dictated program, a plurality of workpiece holders of said common form, conveyor means to convey said workpiece holders to and from the machining units, control means to control the movement of said workpiece holders in the system by said conveyor means so that a holder carrying a particular workpiece is fed only to those selected machining units required to perform machining operations on that workpiece, said control means including programming means to dictate to each machining unit the particular selected machining program to be performed on the particular workpiece presented to it.*

*27. A production system for machining workpieces to produce a variety of components comprising a plurality of data-controlled machining units to perform different operations on work-in-process, means to effect operative juxtapositioning of selected machining units and differing workpieces, conveyor means to cause relative movement between the machining units and the workpieces along a path from which there is access between any of the articles and any of the machining units, and control devices operable to control said relative movement between the machining units and the workpieces in the system by the conveyor means so that only selected machining units and selected workpieces are brought into operative juxtaposition, so that different workpieces and different preselected machining units are brought into operative juxtaposition, the selection being dependent in each case on the particular workpiece, said machining units being capable of simultaneous operation on different workpieces.*

*28. A production system for machining workpieces to produce a variety of components, comprising a plurality of data-controlled machining units, means to effect operative positional relationship between each machining unit and differing workpieces, each said machining unit being capable of performing machining operations according to a dictated program, conveyor means to effect relative movement between workpieces and the machining units, control means to control such relative movement effected by said conveyor means so that a particular workpiece and only those selected machining units required to perform machining operations on that workpiece are brought into operative positional relationship, said control means including a programming device to dictate to each machining unit the particular selected machining program to be performed on a particular workpiece.*

References Cited

The following references, cited by the Examiner, are of record in the patented file of this patent or the original patent.

UNITED STATES PATENTS

| | | | |
|---|---|---|---|
| 2,139,403 | 12/1938 | Cole | 29—33 |
| 2,238,921 | 4/1941 | Waldsmith | 29—33 |
| 2,363,208 | 11/1944 | Sulzer | 29—26 |
| 2,688,415 | 9/1954 | O'Leary | 214—11 |
| 2,803,333 | 8/1957 | Freeman | 29—33 |

ANDREW R. JUHASZ, Primary Examiner

U.S. Cl. X.R.

198—19, 38